(12) United States Patent
Minami et al.

(10) Patent No.: US 12,055,713 B2
(45) Date of Patent: Aug. 6, 2024

(54) HEAD-UP DISPLAY SYSTEM

(71) Applicant: Panasonic Intellectual Property Management Co., Ltd., Osaka (JP)

(72) Inventors: Kazuhiro Minami, Osaka (JP); Hiroaki Okayama, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/988,156

(22) Filed: Nov. 16, 2022

(65) Prior Publication Data

US 2023/0073556 A1   Mar. 9, 2023

Related U.S. Application Data

(63) Continuation of application No. PCT/JP2020/048252, filed on Dec. 23, 2020.

(30) Foreign Application Priority Data

May 21, 2020   (JP) .................................. 2020-088969

(51) Int. Cl.
*G02B 27/01* (2006.01)
*G09G 3/00* (2006.01)

(52) U.S. Cl.
CPC ......... *G02B 27/0101* (2013.01); *G09G 3/001* (2013.01); *G09G 2320/0693* (2013.01);
(Continued)

(58) Field of Classification Search
CPC ............... G02B 27/0101; G09G 3/001; G09G 2320/0693; G09G 2340/0464;
(Continued)

(56) References Cited

U.S. PATENT DOCUMENTS

2009/0278765 A1* 11/2009 Stringfellow ........ H04N 9/3185
345/7
2014/0253821 A1* 9/2014 Takatoh ............. G02B 27/0101
349/11

(Continued)

FOREIGN PATENT DOCUMENTS

EP   2 515 156 A1   10/2012
FR   3 060 774 A1   6/2018
(Continued)

OTHER PUBLICATIONS

Translation of the International Preliminary Report on Patentability issued Dec. 1, 2022 in International Application No. PCT/JP2020/048252.
(Continued)

*Primary Examiner* — Brent D Castiaux
(74) *Attorney, Agent, or Firm* — Wenderoth, Lind & Ponack, L.L.P.

(57) ABSTRACT

A head-up display system displays a virtual image superimposed on a real view that can be visually recognized through a window part. The head-up display system includes a display part, an optical system, a light source part, an operation part, and a controller. The controller controls a display area of the display part in accordance with an operation of the operation part by the observer. The light flux emitted from the display part is reflected by the window part and reaches a visually recognizable area where the observer can visually recognize the virtual image. The light emitted from the light source part is reflected inside an area where the light flux is reflected by the window part and reaches the visually recognizable area. The virtual image and the light from the light source part are superimposed, and can be visually recognized.

15 Claims, 14 Drawing Sheets

(52) U.S. Cl.
CPC . *G09G 2340/0464* (2013.01); *G09G 2354/00* (2013.01); *G09G 2380/10* (2013.01)

(58) Field of Classification Search
CPC .......... G09G 2354/00; G09G 2380/10; B60K 35/00; B60K 35/10; B60K 35/23; B60K 2360/149
See application file for complete search history.

(56) References Cited

U.S. PATENT DOCUMENTS

| | | | |
|---|---|---|---|
| 2016/0195727 A1 | 7/2016 | Kuzuhara et al. | |
| 2018/0031834 A1 | 2/2018 | Yamamura | |
| 2019/0107713 A1* | 4/2019 | Sato | G02B 5/0263 |
| 2020/0064640 A1 | 2/2020 | Nagano et al. | |
| 2020/0108719 A1* | 4/2020 | Sumiyoshi | G09G 5/38 |
| 2020/0124846 A1* | 4/2020 | Higashiyama | G02B 27/0101 |

FOREIGN PATENT DOCUMENTS

| | | |
|---|---|---|
| JP | 2019-095690 A | 6/2019 |
| JP | 2019-217790 A | 12/2019 |
| JP | 6629889 | 1/2020 |
| WO | 2015/159523 A1 | 10/2015 |
| WO | 2016/136573 A1 | 9/2016 |
| WO | 2019/224922 | 11/2019 |

OTHER PUBLICATIONS

International Search Report issued Mar. 30, 2021 in International Application No. PCT/JP2020/048252.
Extended European Search Report issued Nov. 16, 2023 in corresponding European Patent Application No. 20936270.6, 11 pages.
Fuhrmann et al., "Practical Calibration Procedures for Augmented Reality", In: "Rendering Techniques ’ 98", Jan. 1, 2000, XP055203486, 12 pages.
Office Action issued Jun. 18, 2024 in corresponding Japanese application No. 2022-524873 with machine translation, 8 pages.

* cited by examiner

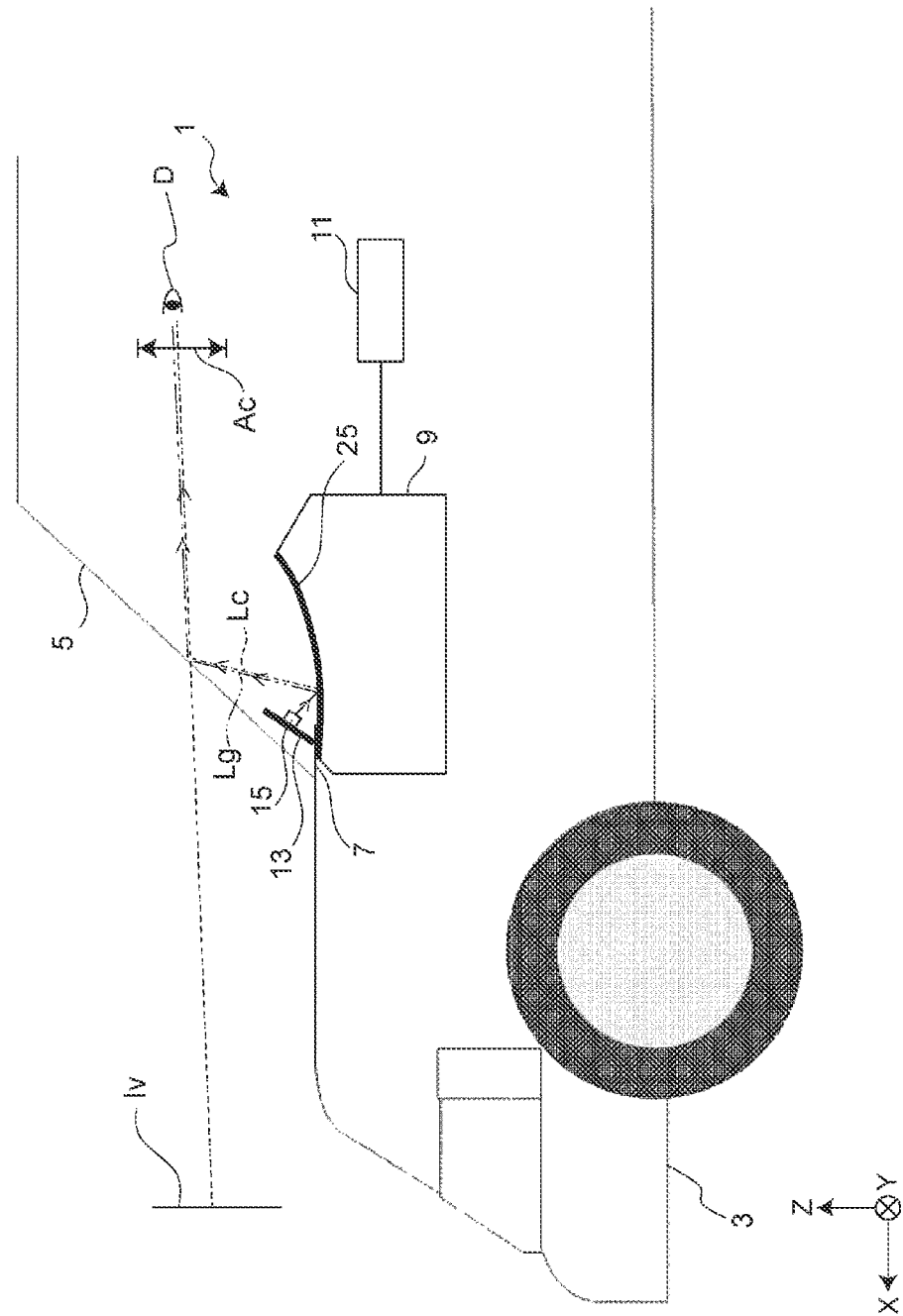

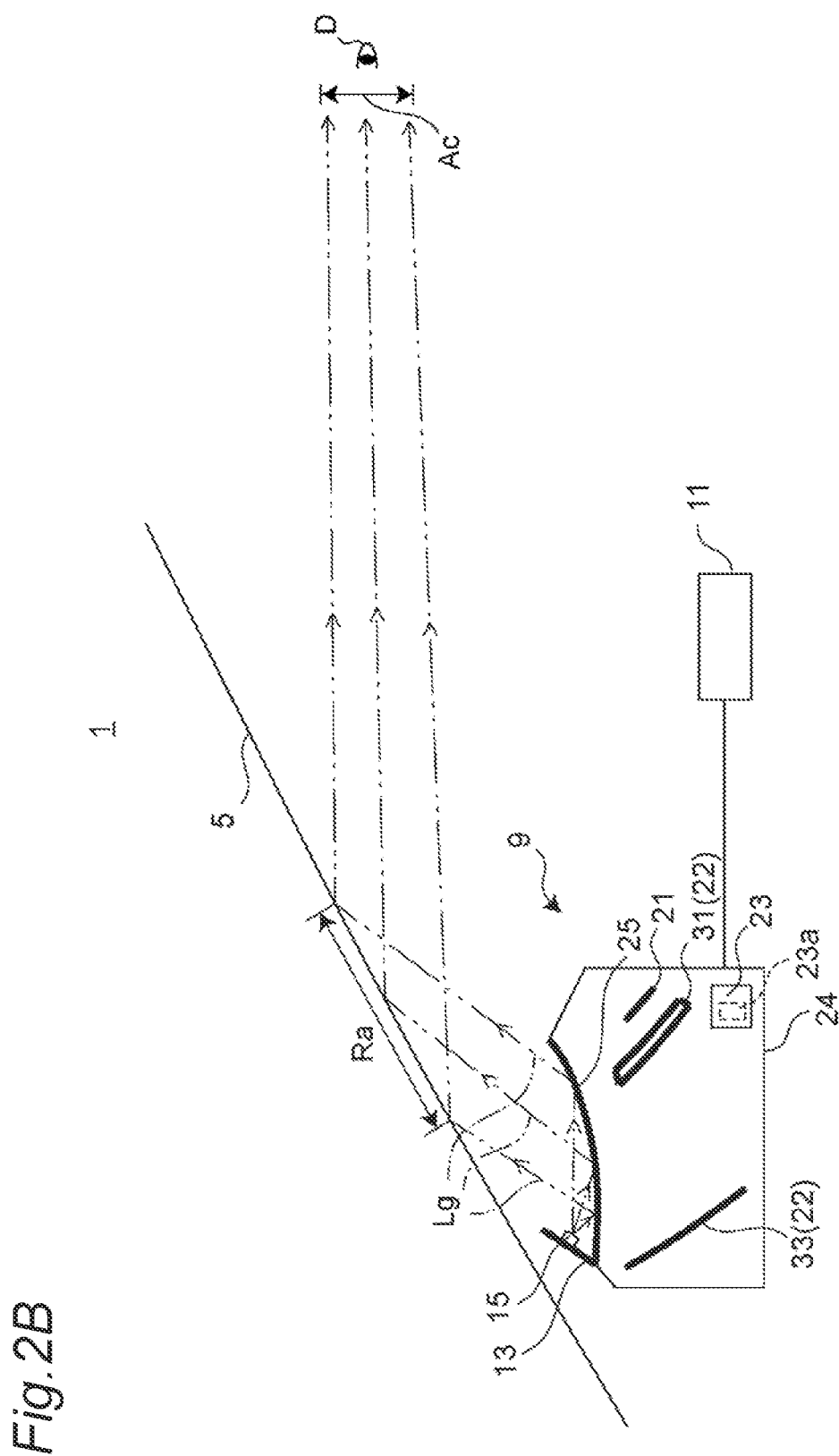

HEAD-UP DISPLAY SYSTEM

CROSS-REFERENCE TO RELATED APPLICATIONS

This is a continuation application of International Application No. PCT/JP2020/048252, with an international filing date of Dec. 23, 2020, which claims priority of Japanese Patent Application No. 2020-88969 filed on May 21, 2020, the content of which is incorporated herein by reference.

BACKGROUND OF THE INVENTION

1. Technical Field

The present disclosure relates to a head-up display system that displays a virtual image.

2. Description of Related Art

WO 2019/224922 A discloses a vehicle information projection system that performs augmented reality (AR) display using a head-up display device. The head-up display device projects light representing a virtual image on a windshield of a vehicle to allow a driver to visually recognize the virtual image together with a real view of an outside world of the vehicle. It is described that a position of an eye of a driver is detected, and a superimposed display area in which the virtual image is superimposed and displayed is changed in accordance with the position of the eye of the driver.

SUMMARY

However, in WO 2019/224922 A, in order to change the superimposed area, a tilt angle of a reflection mirror that reflects the image displayed by a display part on the windshield is adjusted. When the reflection mirror is rotated, a depression angle of the virtual image changes, and a deviation may occur in the superimposition between the real view of the outside world and the virtual image.

The present disclosure provides a head-up display system capable of adjusting a position of a virtual image in accordance with a height of an eye of an observer to reduce a superimposition deviation between a real view of an outside world and the virtual image.

A head-up display system of the present disclosure is a head-up display system that displays a virtual image superimposed on a real view that can be visually recognized through a window part, the head-up display system including: a display part that emits a light flux to be visually recognized by an observer as the virtual image; an optical system that guides the light flux to the window part; a light source part that emits light; an operation part for adjusting a position of the virtual image in a vertical direction; and a controller that controls a display area of the display part in accordance with an operation of the operation part by the observer, wherein the light flux emitted from the display part is reflected by the window part and reaches a visually recognizable area where the observer can visually recognize the virtual image, the light emitted from the light source part is reflected inside an area where the light flux is reflected by the window part and reaches the visually recognizable area, and the virtual image and the light from the light source part are superimposed, and can be visually recognized.

According to the head-up display system of the present disclosure, the position of the virtual image can be adjusted in accordance with a height of an eye of the observer, and superimposition deviation between the real view of an outside world and the virtual image can be reduced.

BRIEF DESCRIPTION OF THE DRAWINGS

FIG. 1 is a view for describing a head-up display system.
FIG. 2B is an explanatory view illustrating an optical path of light emitted from a light source part.

DETAILED DESCRIPTION

First Embodiment

Figure 2A:
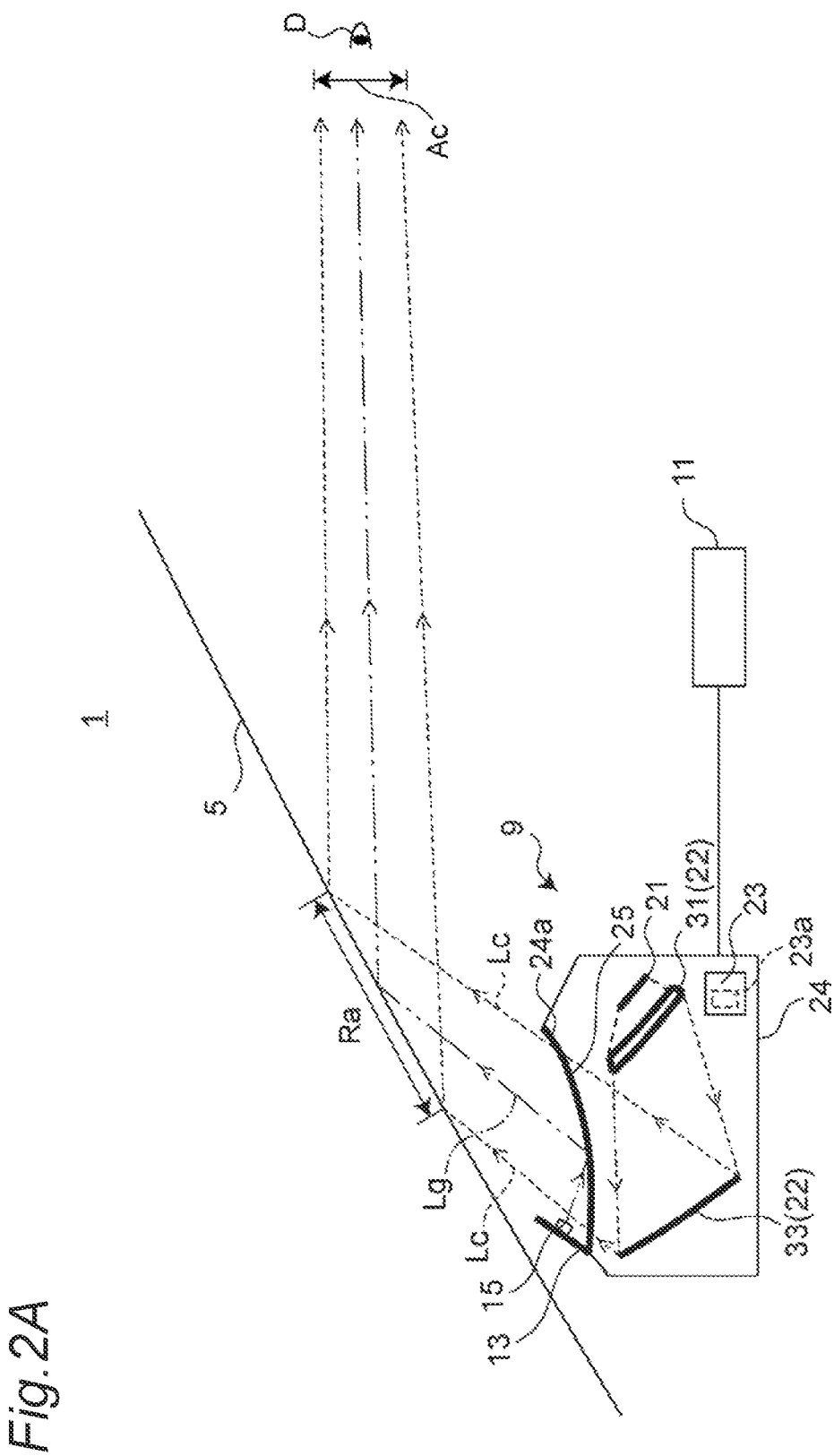
FIG. 2A is a schematic view illustrating a configuration of a head-up display system in a first embodiment.

Hereinafter, referring to FIGS. 1 to 7, a first embodiment will be described.

[1-1. Configuration]

[1-1-1. Overall Configuration of Head-Up Display System]

A specific embodiment and an example of a head-up display system 1 of the present disclosure will be described. FIG. 1 is a view illustrating a cross section of a vehicle 3 on which the head-up display system 1 according to the present disclosure is mounted. As illustrated in FIG. 1, a head-up display device (hereinafter, referred to as a HUD device) 9 is disposed inside a dashboard 7 below a windshield 5 of the vehicle 3. An observer D recognizes an image projected from the HUD device 9 as a virtual image Iv. In this manner, the head-up display system 1 displays the virtual image Iv so as to be superimposed on a real view that can be visually recognized through the windshield 5. In addition, a wall part 13 extending upward from the dashboard 7 is provided. The wall part 13 is, for example, a plate-like member.

FIG. 2A is a schematic view illustrating a configuration of the HUD device 9 according to the present embodiment. FIG. 2B is an explanatory view illustrating an optical path of light Lg emitted from a light source part 15.

As illustrated in FIG. 2A, the HUD device 9 includes a display part 21, a projection optical system 22, a controller 23, a case 24 that accommodates these components, and a transparent member 25 provided in an opening 24a of the case 24. The opening 24a of the case 24 is disposed, for example, in accordance with a position of an opening provided on an upper surface of the dashboard 7.

In the HUD device 9, the display part 21 is an optical member having a diffusion characteristic, and projects a light flux of an image displayed on the display part 21 onto the windshield 5. The projected light flux is reflected by the windshield 5 as a window part and guided to a visually recognizable area Ac of the observer D. Thus, the HUD device 9 causes the observer D to visually recognize the virtual image Iv. The visually recognizable area Ac is an area where the observer D can visually recognize the virtual image Iv without missing.

Here, in the present disclosure, a front direction is a direction in which the windshield 5 of the vehicle 3 exists as viewed from the observer D. A rear direction is a direction opposite to the front direction. A lower direction is a direction of a ground on which the vehicle 3 travels. An upper direction is a direction opposite to the lower direction. A vertical direction is an up-down direction.

Here, as illustrated in FIG. 2A, among light beams emitted from the display part 21, a light beam reaching the visually recognizable area Ac is defined as a light beam Lc.

The display part 21 displays an image on the basis of control of the controller 23. As the display part 21, for example, a liquid crystal display with a backlight, an organic light-emitting diode, a plasma display, or the like can be used. In addition, as the display part 21, an image may be generated using a screen that diffuses or reflects light, and a projector or a scanning laser.

The display part 21 can display various types of information such as, for example, a road guidance display, a distance to a vehicle ahead, a remaining battery level of the vehicle, and a current vehicle speed. The display part 21 allows the observer D to visually recognize the good virtual image Iv by displaying display pixels having plurality of wavelengths shifted in advance for each display position in accordance with chromatic aberration generated in a projection optical system 22.

Figure 3:
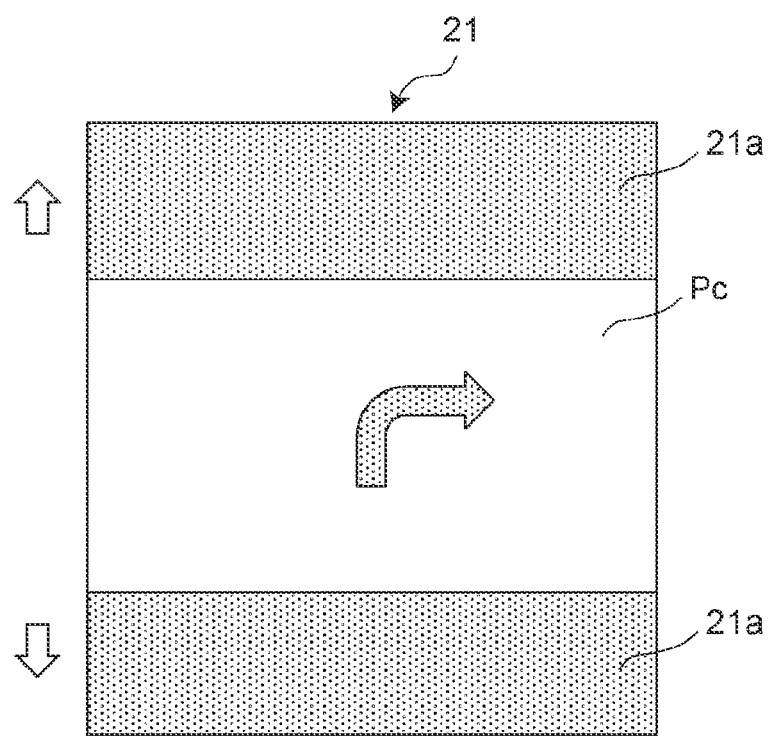
FIG. 3 is an explanatory view illustrating an example of a displayable area of a display part and a displayed image.

As illustrated in FIG. 3, the display part 21 has a displayable area 21a larger in the up-down direction than an image Pc to be displayed. By controlling pixels to be caused to emit light by the controller 23, a display position of the image Pc can be adjusted in the up-down direction. FIG. 3 illustrates an arrow for guiding a destination as an example of the image Pc.

As illustrated in FIGS. 2A and 2B, the projection optical system 22 includes, for example, a lens 31 having a light condensing action and a mirror 33. The projection optical system 22 enlarges the image displayed on the display part 21 and projects the enlarged image on the windshield 5. Therefore, a size of a screen of the display part 21 can be reduced. In addition, the mirror 33 is large enough to reflect all the images projected from the display part 21.

The opening 24a is formed in an upper part of the case 24. The transparent member 25 is a member that covers this opening 24a. The transparent member 25 is made of resin such as, for example, polyethylene terephthalate (PET). The transparent member 25 has a transmittance of about 50% to 90% and a reflectance of about 10% to 50%. The transparent member 25 is disposed on an optical path between the projection optical system 22 and the windshield 5. The light reflected by the mirror 33 passes through the transparent member 25 and reaches the windshield 5. In the windshield 5, an area where the image of the display part 21 is projected and reflected is defined as a reflection area Ra. The transparent member 25 transmits part of incident light and reflects part of the light. The transparent member 25 has a predetermined curvature.

The wall part 13 is provided with the light source part 15. Light emission of the light source part 15 is controlled by the controller 23. The light source part 15 is, for example, an LED, and is an optical element having a divergence angle. As a result of narrowing the light flux from the light source part 15 by curvatures of the transparent member 25 and the windshield 5, a range of the light flux from the light source part 15 only needs to be wider than the visually recognizable area Ac, and thus, the divergence angle is, for example, about 60°.

The light Lg emitted from the light source part 15 is reflected by the transparent member 25 so as to become a light beam corresponding to a depression angle when the virtual image at a desired position is viewed from an inside of the visually recognizable area Ac, and reaches the windshield 5. The light Lg that has reached the windshield 5 is reflected inside the reflection area Ra of the windshield 5 and reaches the visually recognizable area Ac. In this manner, a shape of the transparent member 25 and a position of the light source part 15 are designed corresponding to a shape of the windshield 5 so that the light Lg emitted from the light source part 15 is reflected by the transparent member 25 and the windshield 5 to reach the visually recognizable area Ac. As illustrated in FIG. 2B, the light Lg from the light source part 15 reaches a height of each eye of the observer D. A bright spot of the light Lg serve as a reference for the observer D to calibrate the position of the virtual image Iv.

An operation part 11 is a member for inputting an operation instruction from the observer D. An operation signal corresponding to an operation amount of the observer D is transmitted from the operation part 11 to the controller 23. The operation part 11 is, for example, a button, a cursor key, a remote controller, a touch panel, or the like.

Controller 23 can be implemented by a circuit including a semiconductor element or the like. The controller 23 can be configured by, for example, a microcomputer, a CPU, an MPU, a GPU, a DSP, an FPGA, or an ASIC. The controller 23 reads data and programs stored in a built-in storage 23a and performs various types of arithmetic processing, thereby implementing predetermined functions.

The storage 23a is a storage medium that stores the programs and the data necessary for implementing the functions of the controller 23. The storage 23a can be realized by, for example, a hard disk (HDD), an SSD, a RAM, a DRAM, a ferroelectric memory, a flash memory, a magnetic disk, or a combination thereof.

The storage 23a stores a plurality of pieces of image data representing the virtual image Iv. The controller 23 determines the virtual image Iv to be displayed on the basis of vehicle-related information acquired from an outside. The controller 23 reads the image data of the determined virtual image Iv from the storage 23a and outputs the image data to the display part 21.

[1-1-2. Calibration of Virtual Image Position]

Next, differences between a conventional head-up display system and the head-up display system of the present disclosure will be described. In the conventional head-up display system, it is necessary to adjust a height of the visually recognizable area Ac in the up-down direction in accordance with the height of the eye of the observer D. In the conventional head-up display system, the visually recognizable area Ac is displaced by rotating the mirror 33. However, when the mirror 33 is rotated, the depression angle of the virtual image Iv viewed from the observer D is changed, so that a deviation occurs in superimposition between the outside world and the image, and the position of virtual image Iv may deviate, depending on the height of the eye of the observer D.

Figure 4:
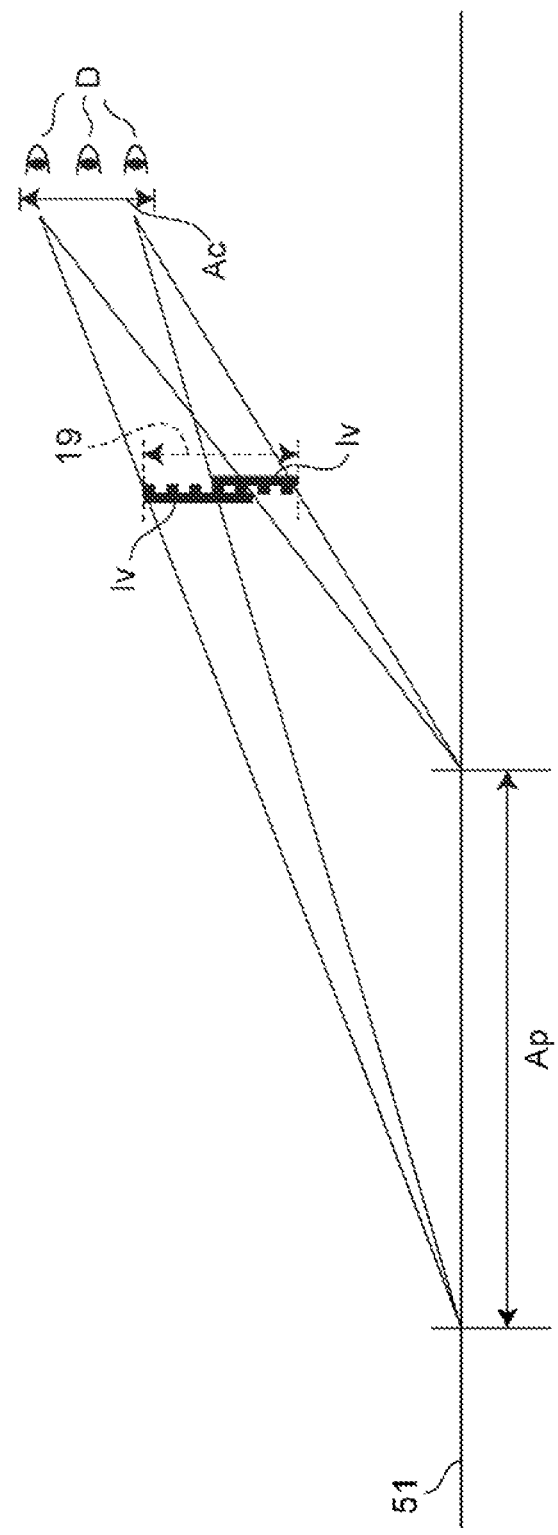
FIG. 4 is an explanatory view illustrating a range where an image is to be superimposed and a displayable range of a virtual image.

In the head-up display system 1 of the first embodiment, a width in a height direction of the visually recognizable area Ac is increased by increasing a display area of the display part 21 instead of adjusting a tilt angle of the mirror 33. As a result, while as illustrated in FIG. 4, the virtual image Iv can be viewed at the same position at any height of the eye, it is necessary to calibrate in which area of the displayable area 21a of the display part 21, whose image is illustrated in FIG. 3, is to be displayed. For example, as illustrated in FIG. 4, in a case where a range Ap on which the image is to be superimposed is set on a traveling road surface 51 away from the vehicle 3 by an arbitrary distance, the position of the virtual image Iv may deviate in the up-down direction to the height of the eye of the observer D because a virtual image displayable range 19 and the visually recognizable area Ac are wide.

Figure 5:
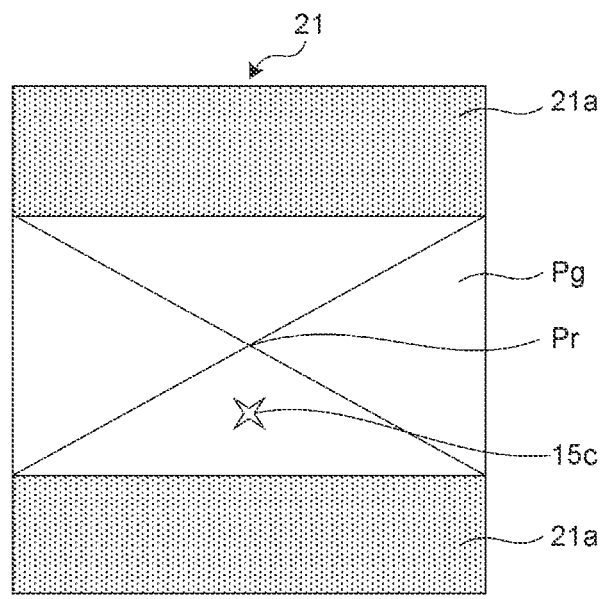
FIG. 5 is an explanatory view illustrating a calibration image and a bright spot of the light source part.

Therefore, by displaying a calibration image Pg as illustrated in FIG. 5 from the display part 21 and turning on the light source part 15 provided on the wall part 13 as illustrated in FIGS. 2A and 2B, the light from the light source part 15 is matched with a reference point Pr of the calibration image Pg, so that video can be matched with a center of the range to be superimposed.

Figure 6:
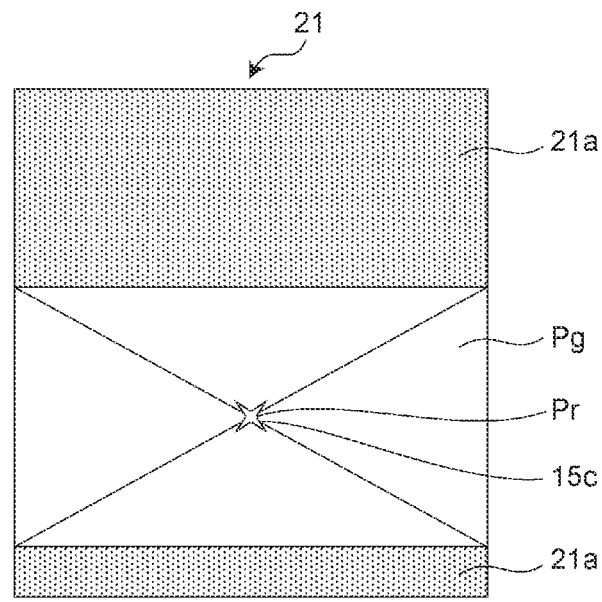
FIG. 6 is an explanatory view illustrating the calibration image and the bright spot of the light source part.

In the case of a state illustrated in FIG. 5, a bright spot 15c from the light source part 15 viewed by the observer D and the reference point Pr that is a center of the calibration image Pg deviate from each other. The bright spot 15c is reference light for calibration. As illustrated in FIG. 6, the observer D adjusts the area where the image is displayed in the displayable area 21a of the display part 21 in accordance with an instruction from the operation part 11, and the calibration image Pg is moved, so that the reference point Pr is matched with the bright spot 15c from the light source part 15.

Figure 7:
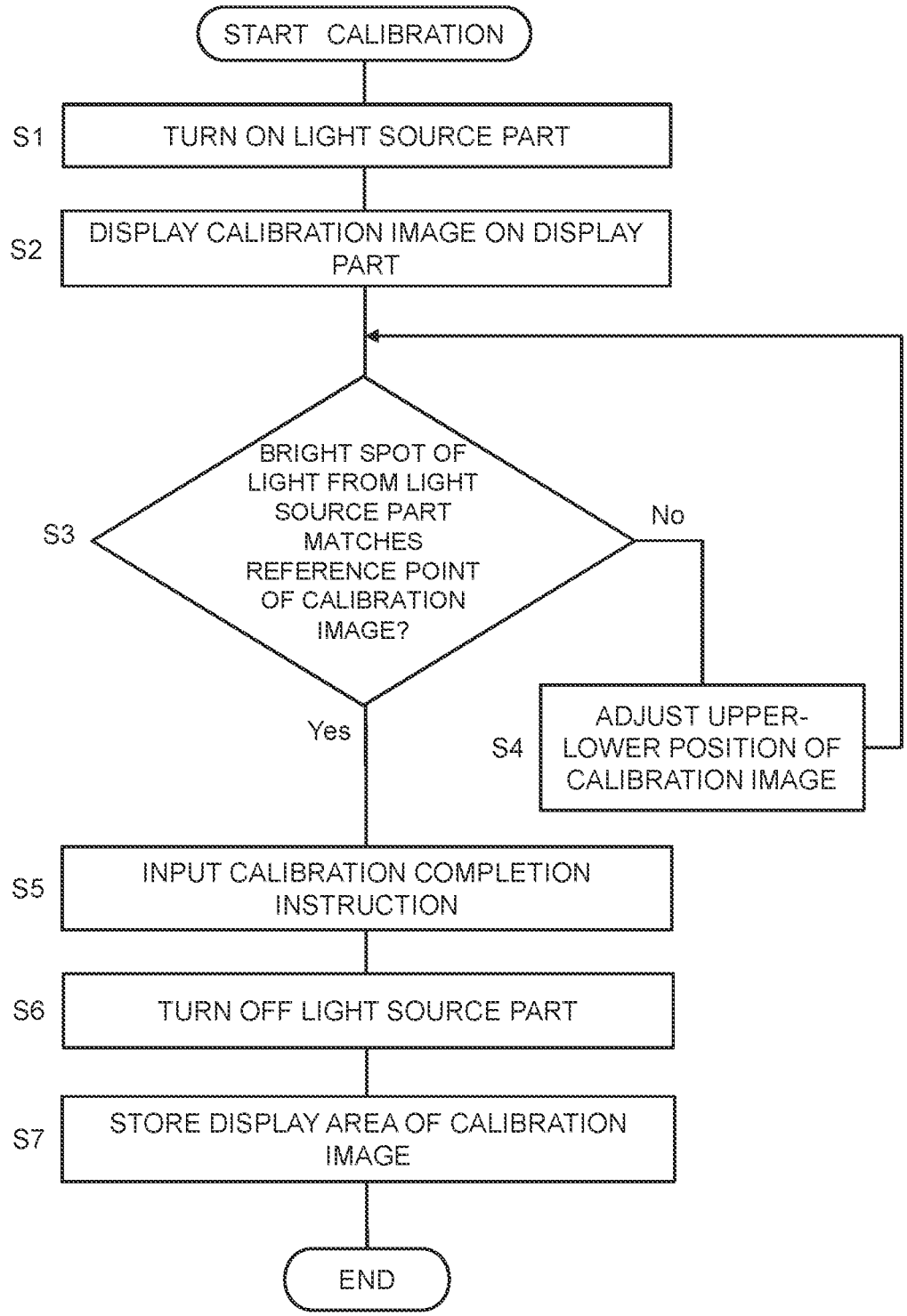
FIG. 7 is an explanatory diagram illustrating a flow of calibration of virtual image display in the first embodiment.

Next, a flow of the calibration of the virtual image display will be described with reference to FIG. 7.

When the observer D gives an operation instruction through the operation part 11, the calibration of the virtual image Iv is started.

In step S1, upon receiving an instruction to start calibration from the operation part 11, the controller 23 shifts to a calibration mode and turns on the light source part 15 to emit the light Lg. The light Lg that has emitted from the light source part 15 is reflected by the transparent member 25 and reaches the windshield 5, and is reflected inside the reflection area 5a of the windshield 5 and reaches the visually recognizable area Ac.

In step S2, in the calibration mode, the controller 23 switches the display image displayed on the display part 21 to the calibration image Pg and displays the calibration image Pg. The display part 21 displays the calibration image Pg in a partial area of the displayable area 21a. The displayed calibration image Pg is enlarged by the lens 31, reflected by the mirror 33 toward the windshield 5, reflected inside the reflection area 5a of the windshield 5, and reaches the visually recognizable area Ac.

In step S3, the observer D determines whether or not the bright spot 15c of the light Lg from the light source part 15 matches the reference point Pr of the calibration image Pg. As illustrated in FIG. 5, when the observer D determines that the bright spot 15c by the light Lg from the light source part 15 does not match the reference point Pr of the calibration image Pg (No in S3), the observer D operates the operation part 11 to adjust an upper-lower position of the calibration image Pg so that the reference point Pr of the calibration image Pg matches the bright spot 15c in step S4. The controller 23 can move the calibration image Pg in the up-down direction by displacing the display area of the display part 21 in accordance with the operation signal of this operation part 11.

By this operation, when the observer D determines that the bright spot 15c by the light Lg from the light source part 15 matches the reference point Pr of the calibration image Pg (Yes in S3), the observer D inputs a calibration completion instruction to the operation part 11 in step S5.

Upon receiving a signal indicating the calibration completion instruction from the operation part 11, the controller 23 turns off the light source part 15 and stops the emission of the light Lg in step S6.

In step S7, the controller 23 causes the storage 23a to store the display area of the calibration image Pg in the display part 21, terminates the calibration mode, and displays the image Pc to be the virtual image Iv in this display area of the display part 21.

[1-2. Effects and the Like]

The head-up display system 1 of the present disclosure includes the display part 21 that emits the light flux visually recognized by the observer D as the virtual image Iv, the projection optical system 22 that guides the light flux to the windshield 5, the light source part 15 that emits the light, the operation part 11 for adjusting the position of the virtual image Iv in the longitudinal direction, and the controller 23 that controls the display area of the display part 21 in accordance with an operation of the operation part 11 by the observer. The light flux emitted from the display part 21 is reflected by the windshield 5 and reaches the visually recognizable area Ac where the observer D can visually recognize the virtual image Iv. The light flux of the light Lg that has emitted from the light source part 15 is reflected inside the reflection area Ra of the windshield 5 and reaches the visually recognizable area Ac. The virtual image and the light Lg from the light source part 15 can be visually recognized in a superimposed manner.

The light Lg that is emitted from the light source part 15, which is a light source different from the display part 21, and serves as a reference for the calibration of the position of the virtual image Iv is reflected in the reflection area Ra of the windshield 5 where the image from the display part 21 as the virtual image is reflected. This light Lg is corrected to become the light beam corresponding to the depression angle when the virtual image Iv at a desired position is viewed from the inside of the visually recognizable area Ac. Consequently, even if the eye position of the observer D changes in the up-down direction, the display area of the display part 21 can be adjusted on the basis of the light Lg from the light source part 15, so that a positional relationship between the virtual image Iv and a scene of the outside world from the windshield 5 can be adjusted to a desired positional relationship. Therefore, the position of the virtual image Iv can be adjusted in accordance with the height of the eye of the observer D, and the superimposition deviation between the real view of the outside world and the virtual image Iv can be reduced.

Note that the wall part 13 is not limited to the plate-shaped member, and may be a box-shaped member. In this case, the light source part 15 may be accommodated in the wall part 13, and the light Lg emitted from the light source part 15 may be directed to the transparent member 25 through a through-hole provided in a surface of the wall part 13. In addition, the light source part 15 may be embedded and fixed in the plate-shaped wall part 13.

Furthermore, the light source part 15 may be disposed on the transparent member 25 instead of the wall part 13. The light Lg that has emitted from the light source part 15 disposed in the transparent member 25 is reflected in the reflection area Ra of the windshield 5 and is directed to the visually recognizable area Ac.

In addition, in the calibration mode, the controller 23 may cause the display part 21 to display the image Pc instead of displaying the calibration image Pg, and adjust the position of the virtual image Iv of the image Pc with respect to the bright spot 15c of the light source part 15 by moving the image Pc in the displayable area 21a of the display part 21 in accordance with the operation amount of the observer D. When the position of the image Pc or the calibration image Pg is adjusted, the positions in the optical member and the windshield 5 where the light beam Lc constituting the image Pc or the calibration image Pg is transmitted and reflected change in accordance with the display position of the image Pc or the calibration image Pg. Therefore, the virtual image Iv resulting from projecting the image Pc or the calibration image Pg may be distorted. Since this distortion can be predicted in accordance with the display position of the image Pc or the calibration image Pg, a correction parameter may be stored in the storage 23a. In order to correct the distortion of the virtual image Iv in accordance with the display position of the image Pc or the calibration image Pg, the controller 23 may acquire the correction parameter stored in the storage 23a and correct the image Pc or the calibration image Pg.

Second Embodiment

In the first embodiment, the light source part 15 is disposed on the wall part 13. In a second embodiment, the light source part 15 is disposed in a HUD device 9A. Configurations other than this point and points described below are common between the head-up display system 1 and the HUD device 9 of the first embodiment and a head-up display system 1A and the HUD device 9A of the second embodiment.

Figure 8:
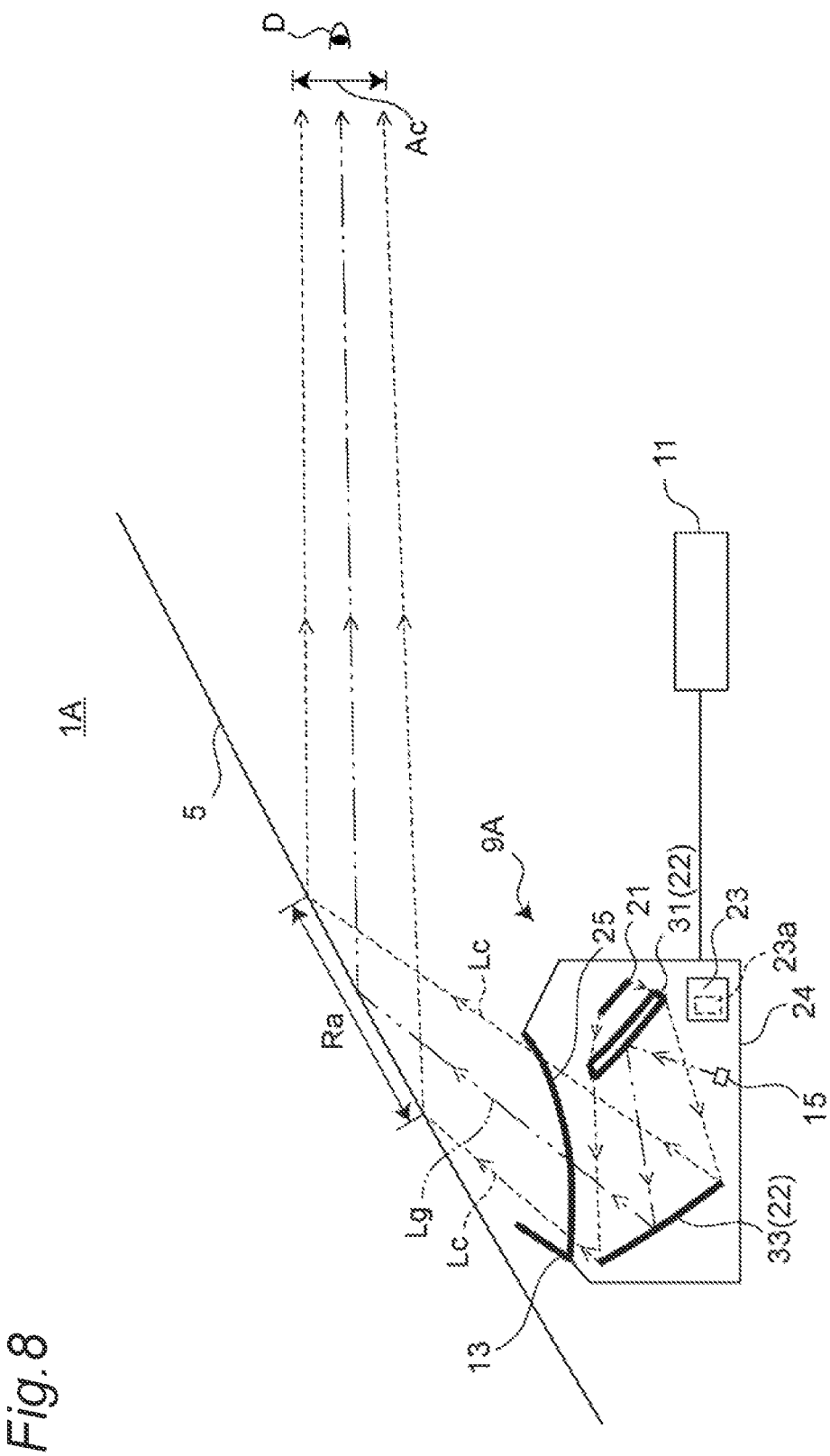
FIG. 8 is a schematic view illustrating a configuration of a head-up display system in a second embodiment.

FIG. 8 is a schematic view illustrating a configuration of the head-up display system 1A in the second embodiment.

In the second embodiment, the light source part 15 is disposed inside the HUD device 9A, and the light Lg from the light source part 15 is reflected inside the projection optical system 22. For example, the light Lg emitted from the light source part 15 is reflected by the lens 31 toward the mirror 33, and further, the light Lg reflected by the mirror 33 is transmitted through the transparent member 25, is reflected inside the reflection area Ra of the windshield 5, and reaches the visually recognizable area Ac. In this manner, the position of the light source part 15 with respect to the projection optical system 22 is designed corresponding to the shape of the windshield 5 so that the light Lg emitted from the light source part 15 is reflected inside the projection optical system 22, reflected by the windshield 5, and reaches the visually recognizable area Ac.

In this manner, even in the configuration in which the light source part 15 is disposed inside the HUD device 9A and the light Lg from the light source part 15 is reflected inside the projection optical system 22 and reaches the visually recognizable area Ac, it is possible to obtain the same effects as those of the first embodiment.

Third Embodiment

In the second embodiment, the light Lg from the light source part 15 is reflected inside the projection optical system 22. In a third embodiment, the light Lg from the light source part 15 is reflected by the display part 21. Configurations other than this point and points described below are common between the head-up display system 1A and the HUD device 9A of the second embodiment and a head-up display system 1B and a HUD device 9B of the third embodiment.

Figure 9:
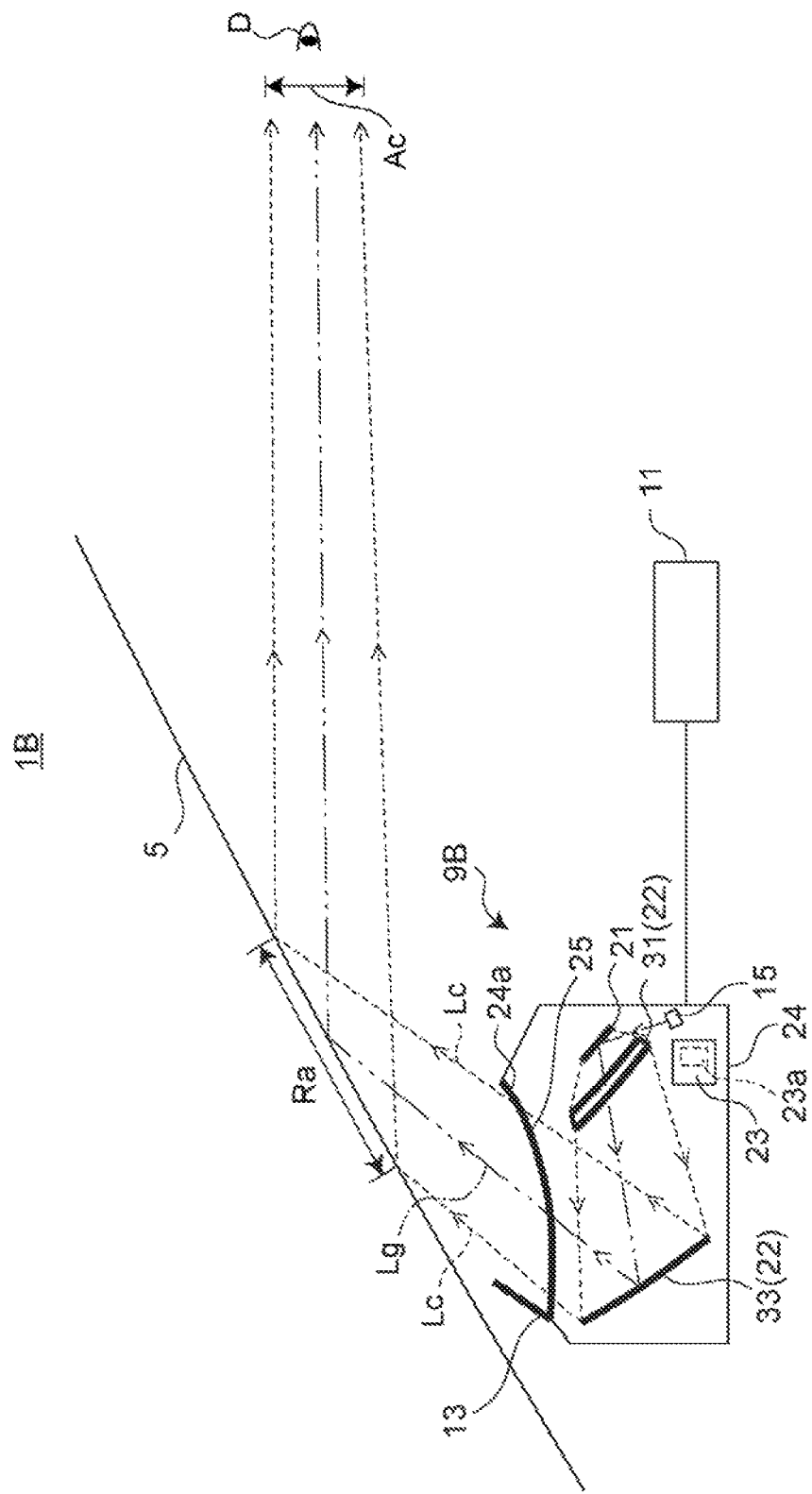
FIG. 9 is a schematic view illustrating a configuration of a head-up display system in a third embodiment.

FIG. 9 is a schematic view illustrating a configuration of the head-up display system 1B in the third embodiment.

In the third embodiment, the light source part 15 is disposed inside the HUD device 9B, and the light Lg from the light source part 15 is reflected by the display part 21. The light Lg emitted from the light source part 15 is reflected by the display part 21, is transmitted through the lens 31, is further reflected by the mirror 33, is transmitted through the transparent member 25, is then reflected inside the reflection area Ra of the windshield 5, and reaches the visually recognizable area Ac.

In this manner, even in the configuration in which the light source part 15 is disposed inside the HUD device 9B and the light Lg from the light source part 15 is reflected by the display part 21 and reaches the visually recognizable area Ac, it is possible to obtain the same effects as those of the first embodiment.

Fourth Embodiment

A fourth embodiment is a configuration in which an optical element 41 is disposed between the light source part 15 and the projection optical system 22 in the head-up display system 1A of the second embodiment. Configurations other than this point and points described below are common between a head-up display system 1C and a HUD device 9C of the fourth embodiment and the head-up display system 1A and the HUD device 9A of the second embodiment.

Figure 10:
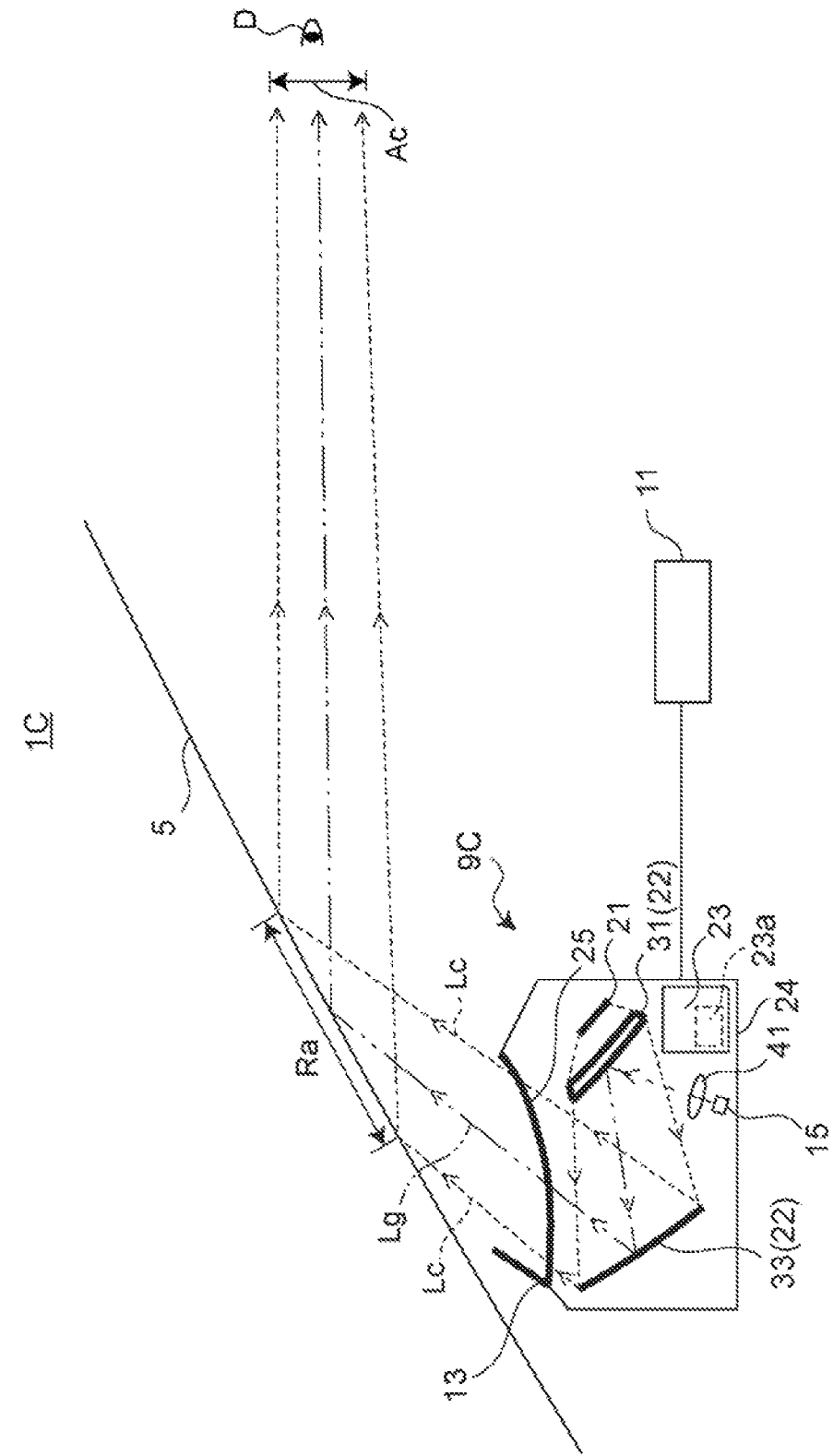
FIG. 10 is a schematic view illustrating a configuration of a head-up display system in a fourth embodiment.

FIG. 10 is a schematic view illustrating a configuration of the head-up display system 1C in the fourth embodiment.

In the fourth embodiment, the light source part 15 and the optical element 41 are disposed inside the HUD device 9C, and the light Lg emitted from the light source part 15 is transmitted through the optical element 41 and is reflected by the lens 31. The optical element 41 is, for example, a lens having a light condensing action. The optical element 41 is configured of one or a plurality of optical members such as a lens and a mirror as necessary. The light Lg emitted from the light source part 15 is transmitted through the optical element 41, reflected by the lens 31, and further reflected by the mirror 33. The light Lg reflected by the mirror 33 is transmitted through the transparent member 25, and is then reflected inside the reflection area Ra of the windshield 5 and reaches the visually recognizable area Ac. Note that the light Lg emitted from the light source part 15 may be transmitted through the optical element 41 and be reflected by the display part 21 instead of being transmitted through the optical element 41 and being reflected by the lens 31.

In this manner, since the optical element 41 is disposed between the light source part 15 and the projection optical system 22, the light of the light source part 15 can be corrected. That is, since a degree of freedom in design is improved, it is possible to obtain the same effects as those of the first embodiment while improving quality of the virtual image Iv.

Fifth Embodiment

A fifth embodiment is a configuration in which the light source part 15 is movable in the head-up display system 1 of the first embodiment. Configurations other than this point and points described below are common between a head-up display system 1D of the fifth embodiment and the head-up display system 1 of the first embodiment.

Figure 11:
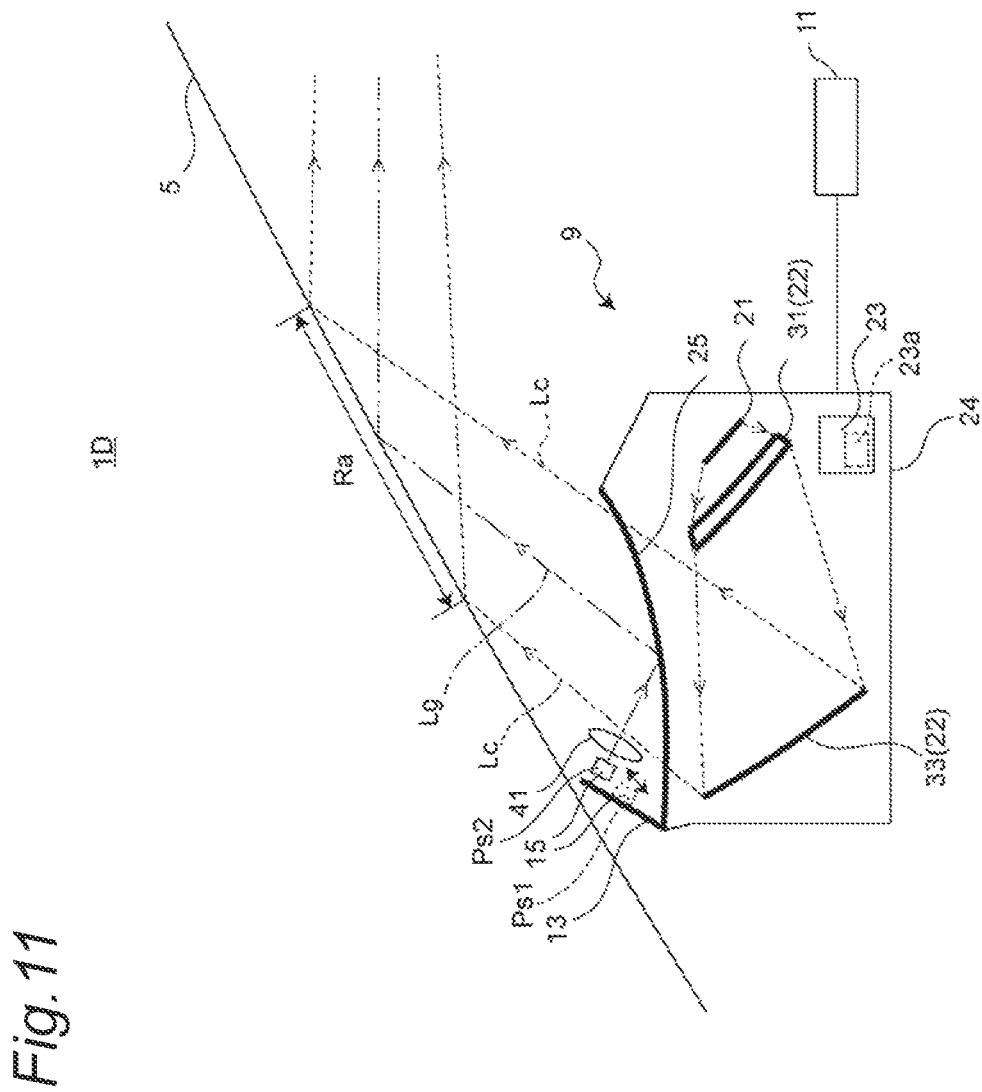
FIG. 11 is a schematic view illustrating a configuration of a head-up display system in a fifth embodiment.

FIG. 11 is a schematic view illustrating a configuration of the head-up display system 1D in the fifth embodiment. The light source part 15 is attached to the wall part 13 so as to be displaceable toward the transparent member 25. The optical element 41 is disposed on an optical path between the light source part 15 and the transparent member 25. At the time of calibration of the virtual image Iv, the controller 23 controls the movement of the light source part 15 from an accommodation position Ps1 indicated by a broken line of the wall part 13 to a calibration position Ps2 suitable for calibration, for example, using a motor and a rack-and-pinion mechanism. Therefore, when the calibration of the virtual image Iv ends, the light source part 15 is returned to the accommodation position Ps1 of the wall part 13. As a result, the calibration can be appropriately performed regardless of the position of the wall part 13 and the shape of the transparent member 25.

Note that the optical element 41 may be displaceable instead of the light source part 15 being displaceable. Furthermore, in a case where the light source part 15 is displaceable, the optical element 41 may be omitted.

Sixth Embodiment

A sixth embodiment is a configuration in which the light source part 15 includes a plurality of optical elements in the head-up display system 1 of the first embodiment. Configurations other than this point and points described below are common between a head-up display system 1E of the sixth embodiment and the head-up display system 1 of the first embodiment.

Figure 12:
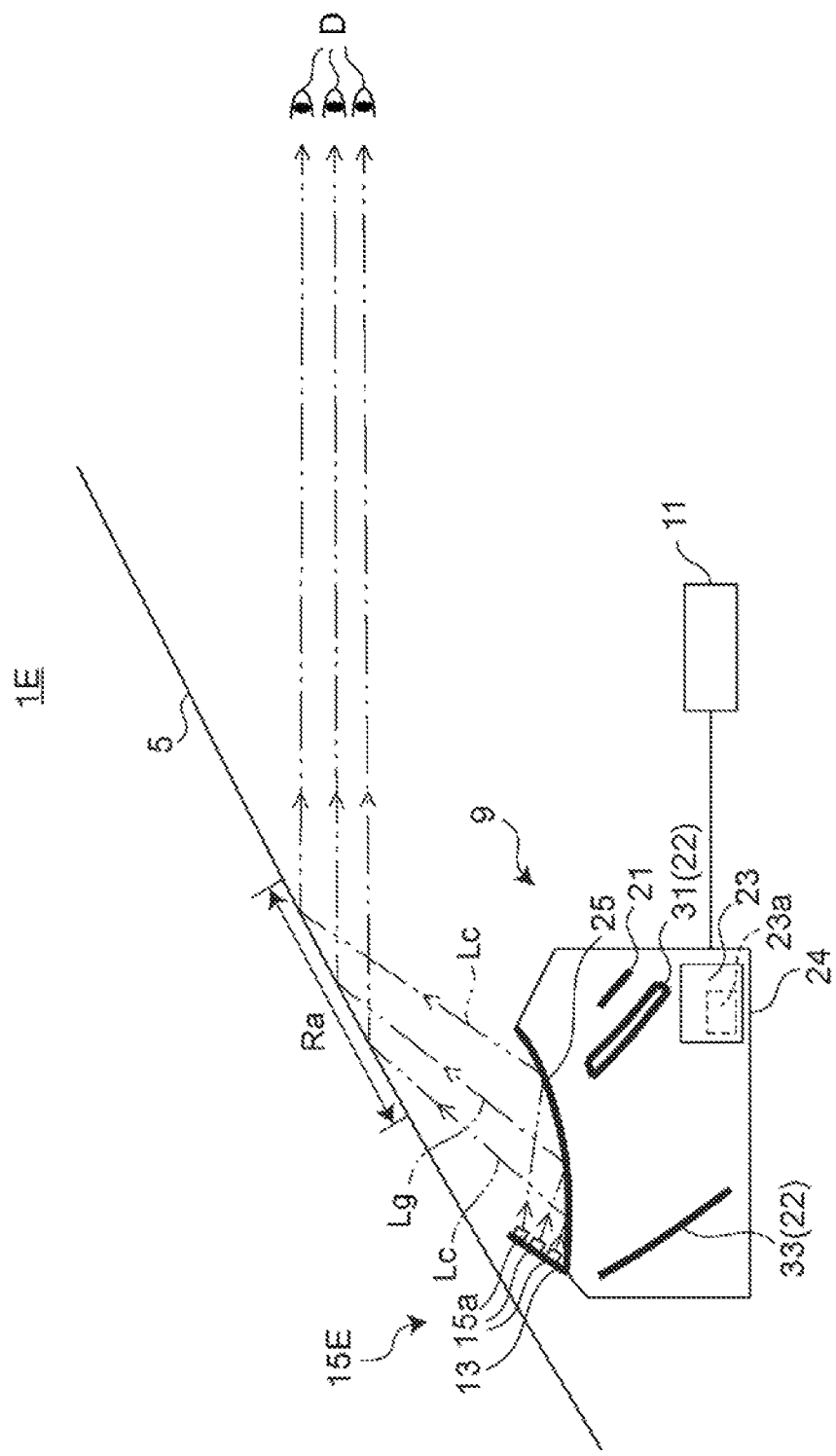
FIG. 12 is a schematic view illustrating a configuration of a head-up display system in a sixth embodiment.
Figure 13:
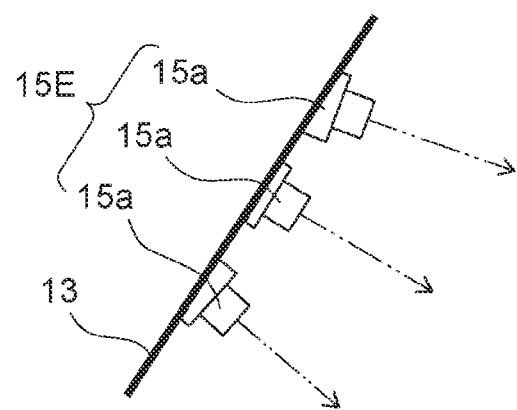
FIG. 13 is a schematic view illustrating a configuration of a light source part in the sixth embodiment.

FIG. 12 is a schematic view illustrating a configuration of the head-up display system 1E in the sixth embodiment. FIG. 13 is an enlarged view of a light source part 15E.

The light source part 15E has a plurality of optical elements 15a. Each of the optical elements 15a emits light having directivity. The optical element 15a is, for example, a laser element. Each of the optical elements 15a has a different light irradiation direction. As a result, it is possible to change the visible optical element 15a in accordance with the height of the eye of the observer D. In this manner, by appropriately designing a position and a projection direction of each of the optical elements 15a, the observer D can visually recognize the reference light for calibration according to the height of the eye, so that the virtual image Iv can be adjusted to an appropriate position.

Figure 14:
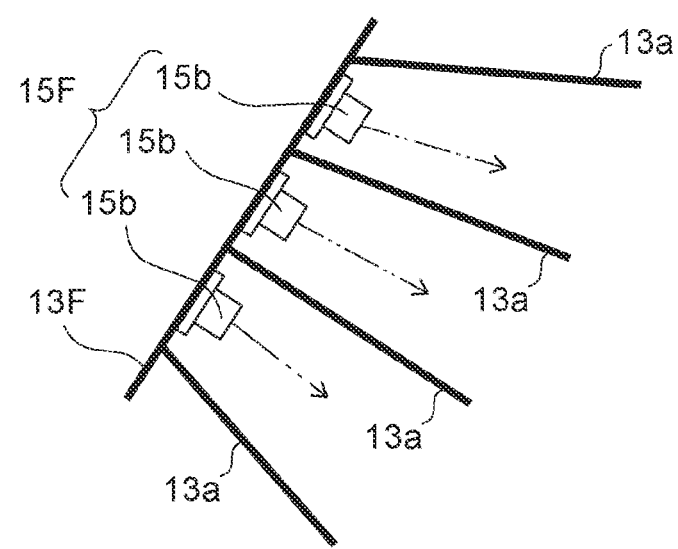
FIG. 14 is a schematic view illustrating a configuration of a light source part in a modification of the sixth embodiment.

Furthermore, in order to impart directivity to the light emitted from each of the optical elements 15a, as illustrated in FIG. 14, a wall part 13F may have a cylindrical part 13a extending along an emission direction of each of the optical elements 15a. The cylindrical part 13a has a cylindrical shape. Since light emitted from each of the optical elements 15b of a light source part 15F has directivity as a result of being limited by the cylindrical part 13a, it is possible to change the visible optical element 15b in accordance with the height of the eye of the observer D. Consequently, the observer D can visually recognize the calibration reference light in accordance with the height of the eye, so that the virtual image Iv can be adjusted to an appropriate position. In addition, since the cylindrical part 13a is provided, the optical element 15b need not have directivity and need not have a large diffusion angle.

Figure 15:
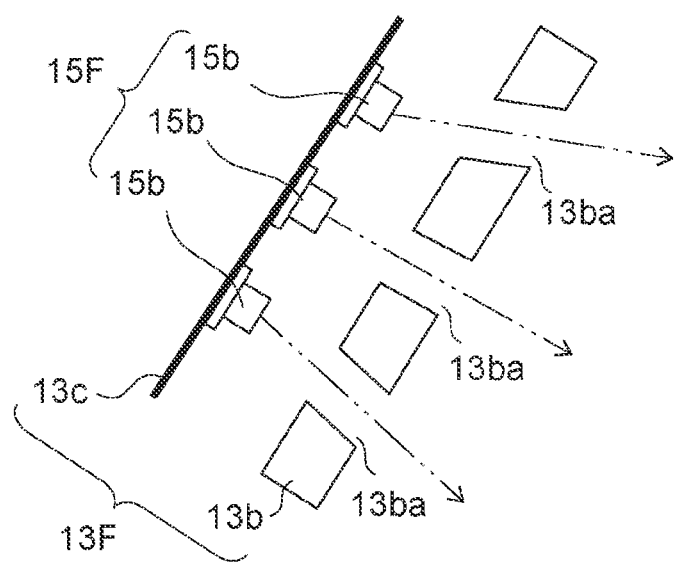
FIG. 15 is a schematic view illustrating a configuration of a light source part in a modification of the sixth embodiment.

Furthermore, the member that imparts directivity to the light emitted from the optical element 15b may have a form as illustrated in FIG. 15. The wall part 13F includes a support plate 13c that supports the plurality of optical elements 15b, and a light shielding plate 13b having through-holes 13b a formed so that light from each of the optical elements 15b advances in different emission directions. With this configuration, since light emitted from each of the optical elements 15b of the light source part 15F has directivity as a result of being limited by each of the through-holes 13ba, it is also possible to change the visible optical element 15b in accordance with the height of the eye of the observer D. Consequently, the observer D can visually recognize the reference light of the calibration in accordance with the height of the eye, so that the virtual image can be adjusted to an appropriate position.

Other Embodiments

As described above, the above embodiments have been described as examples of the technology disclosed in the present application. However, the technique in the present disclosure is not limited thereto, and can also be applied to embodiments in which changes, replacements, additions, omissions, and the like are made as appropriate. Therefore, other embodiments will be exemplified below.

In the above embodiments, the case where the head-up display system 1 is applied to the vehicle 3 such as an automobile has been described. However, an object to which the head-up display system 1 is applied is not limited to the vehicle 3. The object to which the head-up display system 1 is applied may be, for example, a train, a motorcycle, a ship, or an aircraft, or may be an amusement machine without movement. In the case of an amusement machine, the light flux from the display part 21 and the light from the light source part 15 are reflected on a transparent curved plate as the window part that reflects the light flux emitted from the display part 21 instead of the windshield 5. Further, the real view that can be virtually recognized by the user through the transparent curved plate may be video displayed from another video display device. That is, the virtual image by the head-up display system 1 may be superimposed and displayed on the video displayed from the other image display device.

Figure 16:
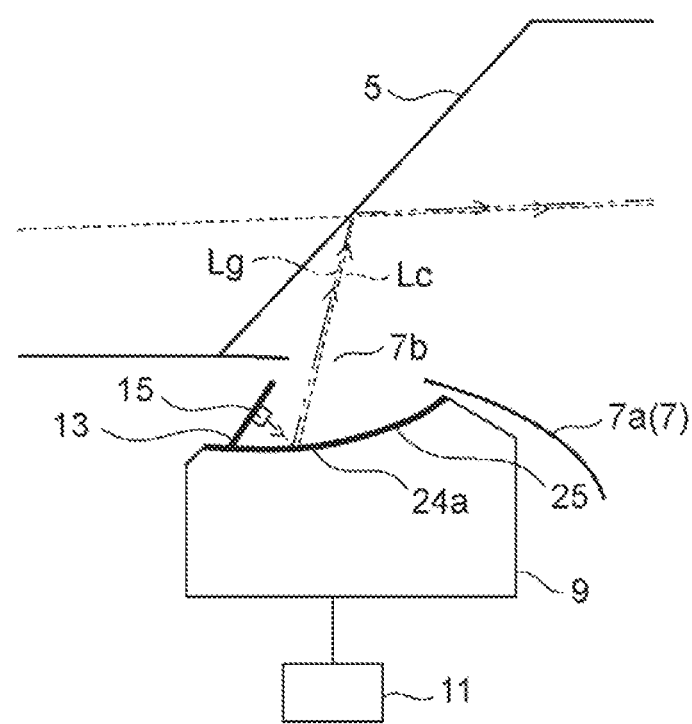
FIG. 16 is a view for describing a head-up display system in a modification of the first embodiment.

While in the above embodiments, the opening 24a of the HUD 9 is disposed along the upper surface of the dashboard 7, the present invention is not limited thereto. As illustrated in FIG. 16, the HUD 9 may be disposed below an upper surface 7a of the dashboard 7. A hole 7b through which the light Lc and the light Lg from the HUD 9 and the light source part 15 pass is formed on the upper surface of dashboard 7. The wall part 13 extends upward from an upper surface of the HUD 9, and the light source part 15 is attached to the wall part 13. The wall part 13 and the light source part 15 are also disposed below the upper surface 7a of the dashboard 7.

Outline of Embodiments (1) A head-up display system of the present disclosure is a head-up display system that displays a virtual image superimposed on a real view that can be visually recognized through a window part, the head-up display system including: a display part that emits a light flux to be visually recognized by an observer as the virtual image; an optical system that guides the light flux to the window part; a light source part that emits light; an operation part for adjusting a position of the virtual image in a vertical direction; and a controller that controls a display area of the display part in accordance with an operation of the operation part by the observer, wherein the light flux emitted from the display part is reflected by the window part and reaches a visually recognizable area where the observer can visually recognize the virtual image, the light emitted from the light source part is reflected inside an area where the light flux is reflected by the window part and reaches the visually recognizable area, and the virtual image and the light from the light source part are superimposed, and can be visually recognized.

Consequently, even if the position of the eye of the observer changes in the up-down direction, the display area of the display part can be adjusted on the basis of the light from the light source part, so that a positional relationship between the image and a scene of the outside world from the window part can be adjusted to a desired positional relationship. Therefore, the position of the virtual image can be adjusted in accordance with the height of the eye of the observer, and the superimposition deviation between the real view of the outside world and the virtual can be reduced.

(2) The head-up display system in (1) includes a transparent member that is installed on an optical path between the optical system and the window part, and through which the light flux from the display part is transmitted, wherein the light from the light source part is transmitted through the transparent member and enters the window part.

(3) The head-up display system in (1) includes a transparent member that is installed on an optical path between the optical system and the window part, and through which the light flux from the display part is transmitted, wherein the light from the light source part is reflected by the transparent member and enters the window part.

(4) In the head-up display system in (3), the light source part is provided on a wall part between the window part and the transparent member.

(5) In the head-up display system in any one of (1) to (4), the display part displays a calibration image for calibration.

(6) In the head-up display system in (5), the calibration image has a reference point for matching the light from the light source part.

(7) In the head-up display system in (5) or (6), the controller switches a display image displayed on the display part to the calibration image in a calibration mode.

(8) In the head-up display system in any one of (1) to (7), the controller moves the calibration image or the display image in a displayable area of the display part in the calibration mode.

(9) In the head-up display system in (8), the controller moves the calibration image or the display image in the displayable area and corrects distortion of the virtual image.

(10) In the head-up display system in any one of (5) to (9), the controller causes a storage to store a display area of the calibration image for which the calibration has been completed in the display part, and causes the display part to display the display image in this stored display area in the display part.

(11) In the head-up display system in any one of (1) to (10), the controller causes the light source part to move from an accommodation position to a calibration position in the calibration mode.

(12) In the head-up display system in any one of (1) to (11), the window part is a windshield of a moving body. Thus, the present invention can be applied as a head-up display system of a moving body.

(13) In the head-up display system in any one of (1) to (12), the light source part includes: a plurality of light sources; and a tubular part that limits an emission direction and a divergence angle of light emitted from each of the plurality of light sources to make the emission directions and the divergence angles from one another.

The present disclosure can be applied to a head-up display system that displays a virtual image in a front of a window part.

EXPLANATIONS OF LETTERS OR NUMERALS 1, 1A, 1B, 1C, 1D, 1E head-up display system
3 vehicle
5 windshield
7 dashboard
9, 9A, 9B, 9C head-up display device (HUD device)
11 operation part
13, 13F wall part
13$a$ cylindrical part
13$b$ light shielding plate
13$ba$ through-hole
13$c$ support plate
15, 15E, 15F light source part
15$a$, 15$b$ optical element
15$c$ bright spot
19 virtual image displayable range
21 display part
21$a$ displayable area
22 projection optical system
23 controller
23$a$ storage
24 case
24$a$ opening
25 transparent member
31 lens
33 mirror
41 optical element
Ac visually recognizable area
Iv virtual image
Pc image
Pg calibration image
Ra reflection area

What is claimed is:

1. A head-up display system that displays a virtual image superimposed on a real view that can be visually recognized through a window part, the head-up display system comprising:
  a display part that emits a light flux to be visually recognized by an observer as the virtual image;
  an optical system that guides the light flux to the window part;
  a light source part that is located at a different position from the display part and emits light;
  an operation part for adjusting a position of the virtual image in a vertical direction;
  a controller that controls a display area of the display part in accordance with an operation of the operation part by the observer; and
  a transparent member that is installed on an optical path between the optical system and the window part, and through which the light flux from the display part is transmitted, wherein
the light flux emitted from the display part passes through a first optical path in the optical system, is reflected by the window part and reaches a visually recognizable area where the observer can visually recognize the virtual image,
the light emitted from the light source part passes through a second optical path at least a part of which is different from the first optical path, is reflected inside an area where the light flux is reflected by the window part and reaches the visually recognizable area, and
the virtual image and the light from the light source part are superimposed, and can be visually recognized, and
the light from the light source part is reflected by the transparent member and enters the window part.

2. The head-up display system according to claim 1, wherein the light source part is provided on a wall part between the window part and the transparent member.

3. The head-up display system according to claim 1, wherein the display part displays a calibration image for calibration.

4. The head-up display system according to claim 3, wherein the calibration image has a reference point for matching the light from the light source part.

5. The head-up display system according to claim 3, wherein the controller switches a display image displayed on the display part to the calibration image in a calibration mode.

6. The head-up display system according to claim 1, wherein the controller moves the calibration image or the display image in a displayable area of the display part in a calibration mode.

7. The head-up display system according to claim 6, wherein the controller moves the calibration image or the display image in the displayable area and corrects distortion of the virtual image.

8. The head-up display system according to claim 3, wherein the controller causes a storage to store a display area of the calibration image for which the calibration has been completed in the display part, and causes the display part to display the display image in this stored display area in the display part.

9. The head-up display system according to claim 1, wherein
the controller causes the light source part to move from an accommodation position to a calibration position in a calibration mode.

10. The head-up display system according to claim 1, wherein the window part is a windshield of a moving body.

11. The head-up display system according to claim 2, wherein the display part displays a calibration image for calibration.

12. The head-up display system according to claim 4, wherein the controller switches a display image displayed on the display part to the calibration image in a calibration mode.

13. The head-up display system according to claim 3, wherein the controller moves the calibration image or the display image in a displayable area of the display part in a calibration mode.

14. The head-up display system according to claim 11, wherein the controller moves the calibration image or the display image in a displayable area of the display part in a calibration mode.

15. A head-up display system that displays a virtual image superimposed on a real view that can be visually recognized through a window part, the head-up display system comprising:
a display part that emits a light flux to be visually recognized by an observer as the virtual image;
an optical system that guides the light flux to the window part;
a light source part that is located at a different position from the display part and emits light;
an operation part for adjusting a position of the virtual image in a vertical direction; and
a controller that controls a display area of the display part in accordance with an operation of the operation part by the observer,
wherein
the light flux emitted from the display part passes through a first optical path in the optical system, is reflected by the window part and reaches a visually recognizable area where the observer can visually recognize the virtual image,
the light emitted from the light source part passes through a second optical path at least a part of which is different from the first optical path, is reflected inside an area where the light flux is reflected by the window part and reaches the visually recognizable area, and
the virtual image and the light from the light source part are superimposed, and can be visually recognized, and
the light source part includes:
a plurality of light sources; and
a tubular part that limits an emission direction and a divergence angle of light emitted from each of the plurality of light sources to make the emission directions and the divergence angles different from one another.

* * * * *